(No Model.)

I. FISHER.
STOP VALVE.

No. 414,509. Patented Nov. 5, 1889.

WITNESSES:
William Miller
Edward Wolff

INVENTOR:
Isaac Fisher
BY
Van Santvoord & Hauff
ATTORNEYS.

UNITED STATES PATENT OFFICE.

ISAAC FISHER, OF NEW YORK, N. Y.

STOP-VALVE.

SPECIFICATION forming part of Letters Patent No. 414,509, dated November 5, 1889.

Application filed July 18, 1889. Serial No. 317,923. (No model.)

*To all whom it may concern:*

Be it known that I, ISAAC FISHER, a citizen of the United States, residing at New York, in the county and State of New York, have invented new and useful Improvements in Stop-Valves, of which the following is a specification.

The object of this invention is a stop-valve by means of which the flow of a liquid or fluid through a pipe or conduit can be regulated, and which can be closed tight without difficulty.

The peculiar and novel construction of my stop-valve is pointed out in the following specification and claims, and illustrated in the accompanying drawings, in which—

Figure 1:
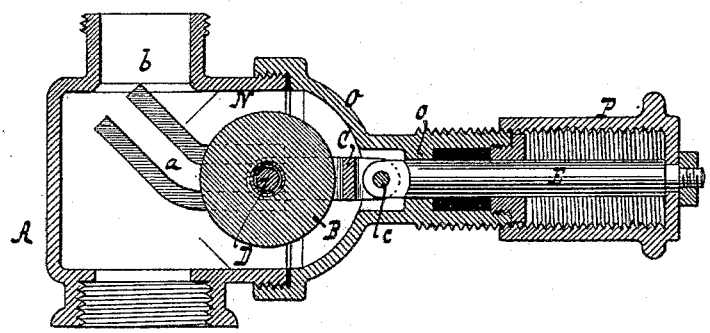
Figure 2:
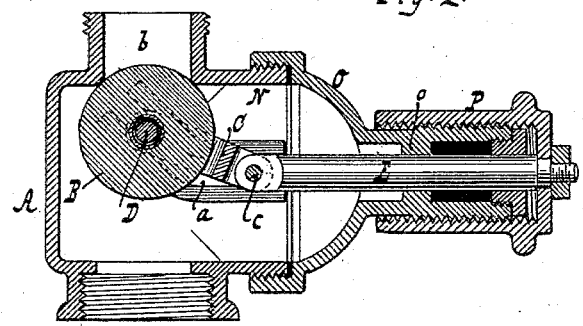
Figure 3:
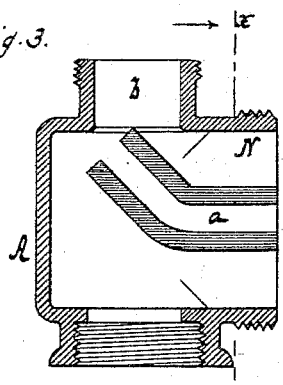
Figure 4:
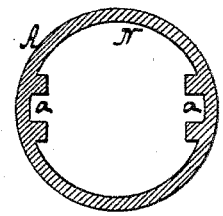
Figure 5:
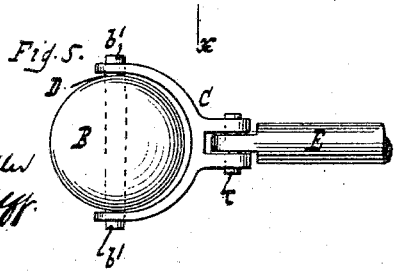

Figure 1 represents a longitudinal central section when the valve is wide open. Fig. 2 is a similar section when the valve is closed. Fig. 3 is a central section of the shell. Fig. 4 is a transverse section of the same in the plane $x\ x$, Fig. 3. Fig. 5 is a plan of the valve and its carrier detached.

Similar letters indicate corresponding parts.

In the drawings, the letter A designates the valve-shell, which is open at both ends and provided with screw-threads, by means of which connection can be made with pipes or with a pipe and a nozzle, as may be desired. From the body of this shell extends a tubular nipple N, and in the interior of this nipple and of the body A are formed two guideways $a\ a$, Figs. 3 and 4, the inner ends of which are bent toward the discharge-opening $b$ of the shell A.

B is the valve, which is made in the form of a globe or ball of any material suitable for the purpose. In some cases—for instance, when my valve is to be used to regulate the flow of water through the nozzle of a hose—I make the same of india-rubber; but when the valve is to be used to control the flow of steam through a pipe I make the ball of asbestus fiber or other material capable of resisting the heat of steam. The valve B is carried in a yoke C, adapted to swing in the arc of a circle and hinged to the lengthwise-movable spindle E. The valve is fitted into this yoke, so that it can revolve freely round its axis. In the example shown in the drawings a pin D extends loosely through the ball-valve B, and the ends of this pin form gudgeons $b'\ b'$, which engage the bent guides $a\ a$.

On the tubular nipple N is secured a screw-cap O, through which extends a spindle E, which is connected to the yoke C by a pivot $c$. The screw-cap O is provided with an extension $o$, in the interior of which is formed a stuffing-box, through which the spindle E extends.

P is a cap, which engages a screw-thread on the extension $o$, and which is secured to the spindle E in such a manner that it (the cap) can be turned freely in either direction, thereby imparting to the spindle E a movement in the direction of its length. When the cap P is turned back to the position shown in Fig. 1, the valve B is wide open; but when the cap P is turned to the position shown in Fig. 2 the valve B is firmly pressed into the discharge-opening $b$, so as to close the same. By turning the cap P back the discharge-opening $b$ can be opened more or less, and the quantity of liquid or fluid passing through the same can be regulated. For this reason my stop-valve is of particular advantage when the same is applied to the end of a hose, so that the man who handles the hose and directs the stream of water to the fire can regulate the quantity of water which he throws into a building; but my stop-valve can also be used as a throttle-valve to regulate the flow of steam through a pipe, or for many other purposes.

What I claim as new, and desire to secure by Letters Patent, is—

1. The combination of a shell A, having bent guides $a$, a lengthwise-movable spindle E, a yoke C, swinging in the arc of a circle, hinged to the spindle and engaging the guides, a valve B, carried by and swinging with the yoke, and means for moving the spindle, substantially as described.

2. The combination, with the shell A, provided with bent guides $a$, of a ball-valve B, the yoke C, the pin D, made to extend through the yoke and the valve and to engage the guides $a$, the spindle E, pivoted to the yoke C, and means for imparting to this spindle a movement in the direction of its length, substantially as described.

In testimony whereof I have hereunto set my hand in the presence of two subscribing witnesses.

ISAAC FISHER.

Witnesses:
J. VAN SANTVOORD,
ERNST F. KASTENHUBER.